(12) United States Patent
Jayaram et al.

(10) Patent No.: US 8,274,945 B2
(45) Date of Patent: Sep. 25, 2012

(54) METHOD AND APPARATUS FOR TIME-WARPING PACKETS AT THE SENDER SIDE

(75) Inventors: Ranjith Jayaram, San Diego, CA (US); Sanjiv Nanda, Ramona, CA (US); Manoj Deshpande, San Diego, CA (US); Arnaud Meylan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1143 days.

(21) Appl. No.: 11/549,931

(22) Filed: Oct. 16, 2006

(65) Prior Publication Data

US 2008/0089289 A1    Apr. 17, 2008

(51) Int. Cl.
*H04W 4/00* (2009.01)
*H04W 36/00* (2009.01)
*H04J 3/16* (2006.01)

(52) U.S. Cl. .................. 370/331; 370/465; 455/442

(58) Field of Classification Search .................. 370/331; 455/442
See application file for complete search history.

(56) References Cited

U.S. PATENT DOCUMENTS

| | | | | |
|---|---|---|---|---|
| 6,128,287 A * | 10/2000 | Freeburg et al. | ............. | 370/331 |
| 7,085,560 B2 * | 8/2006 | Petermann | ................ | 455/422.1 |
| 7,852,815 B2 * | 12/2010 | Kezys | ............................ | 370/338 |
| 2006/0045139 A1 * | 3/2006 | Black et al. | .................. | 370/516 |
| 2006/0077994 A1 | 4/2006 | Spindola et al. | | |

FOREIGN PATENT DOCUMENTS

| JP | 8195974 A | 7/1996 |
|---|---|---|
| JP | 8237748 A | 9/1996 |

OTHER PUBLICATIONS

International Search Report—PCT/US07/080439, International Searching Authority—European Patent Office, Mar. 19, 2008.
Kwon, et al., "Soft handoff modeling in CDMA cellular systems" 1997 IEEE 47th Vehicular Technology Conference, vol. 3, pp. 1548-1551.
Written Opinion—PCT/US07/080439, International Searching Authority—European Patent Office, Mar. 19, 2008.
Yavuz M et al: "VOIP Over CDMA2000 1XEV-DO Revision A" IEEE Communications Magazine, IEEE Service Center, New York, NY, US, Vol. 44, No. 2, Feb. 2006 [pp. 88-95, XP001240363].
Yuan Chi et al., "A Novel Burst Assembly Algorithm for OBS networks-Based on Data-length Time-lag Product," Asia-Pacific Conference on Communications, 2005, pp. 319-323.
Taiwan Search Report-TW096138727—TIPO—Jul. 2, 2011.

\* cited by examiner

*Primary Examiner* — Charles Appiah
*Assistant Examiner* — Natasha Cosme
(74) *Attorney, Agent, or Firm* — Peng Zhu; Abdollah Katbab

(57) ABSTRACT

The disclosure is directed to a mobile communication device that is capable of accessing different types of networks such as a circuit-switched network, or any cellular network, and a packet-switched network. During hand-over from the first network to the second network, the sender of packets/frames expands or compresses the packet-switched packets using well-known time-warping techniques. At the receiver end, the received time-warped packets and frames from the second network are appropriately selected so that no unwanted artifacts are introduced during playback.

21 Claims, 13 Drawing Sheets

METHOD AND APPARATUS FOR TIME-WARPING PACKETS AT THE SENDER SIDE

BACKGROUND

1. Field

The present disclosure relates generally to telecommunications, and more particularly, to apparatuses and methods to support a mobile communications device capable of communicating via two different types of communication networks.

2. Background

The demand for wireless information services has led to the development of an ever increasing number of wireless networks. CDMA2000 1x is just one example of a wireless network that provides wide area telephony and data services. CDMA2000 1x is a wireless standard promulgated by the Third Generation Partnership Project 2 (3GPP2) using code division multiple access (CDMA) technology. CDMA is a technology that allows multiple users to share a common communications medium using spread-spectrum processing. A competing wireless network that is commonly employed in Europe is Global System for Mobile Communications (GSM). Unlike CDMA2000 1x, GSM uses narrowband time division multiple access (TDMA) to support wireless telephony and data services. Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications. Other access technologies include EV-DO and High-Speed Downlink Packet Access (HSDPA).

These wireless networks can generally be thought of as wide area networks employing cellular technology. Cellular technology is based on a topology in which the geographic coverage region is broken up into cells. Within each of these cells is a fixed base transceiver station (BTS) that communicates with mobile users. A base station controller (BSC) is typically employed in the geographic coverage region to control the BTSs and route communications to the appropriate gateways for the various packet-switched and circuit-switched networks.

As the demand for wireless information services continue to increase, mobile devices are evolving to support integrated voice, data, and streaming media while providing seamless network coverage between wide area circuit switched cellular networks, wide area packet switched cellular networks and wireless local area networks (LAN). Wireless LANs generally provide telephony and data services over relatively small geographic regions using a standard protocol, such as IEEE 802.11, or the like. The existence of wireless LANs provides a unique opportunity to increase user capacity in a wide area cellular network by extending cellular communications to the unlicensed spectrum using the infrastructure of the wireless LAN.

Recently, various techniques have been employed to enable mobile devices to communicate with different wireless networks such as packet-switched networks and circuit-switched networks. Accordingly, there are now instances in which a session initiated by a mobile device over a circuit-switched network may be handed-off to a packet-switched network. In some of these instances, the communications path delay in the circuit switched network may be different than the communications path delay in the packet-switched network. Accordingly, the respective packets and frames that are being transmitted and received during the hand-off process may not be synchronized with one another and, thereby, introduce unintended and unwanted audible artifacts for the user. Thus, there exists the need, to accomplish such handoffs in a manner that does not compromise the quality and satisfaction experienced by a user of either type of network.

SUMMARY

One aspect of a mobile communications device relates to a method for transmitting in a mobile communications device which is capable of communicating over multiple access networks. In accordance with this method, normal packets created from a stream of speech samples are transmitted over a first network and a first speech sample of a one normal packet is identified that will correspond in time to a first packet to be transmitted to a second network. A certain number of consecutive speech samples beginning with the first sample are chosen and the chosen number of speech samples are expanded to generate from those samples a first expanded packet for transmitting over the first network.

Another aspect of a communications device relates to a communications device which is capable of communicating over multiple access networks. In accordance with this method, a time-expanded packet is received over a first network and a packet is also received over a second network. Then one of the time-expanded packet or the packet is selected for output based on a differential communications path delay between the first network and the second network.

Another aspect of a mobile communications device relates to a method of sending n packets, from a sender to a receiver, during a handoff between a first leg and a second leg. In accordance with this method, a difference is estimated between a) a first delay between sender and receiver before the handoff and b) a second delay between sender and receiver after the handoff. If the difference is positive, then the n packets are expanded into more than n packets and the more than n packets are sent during the handoff. If the difference is negative, then the n packets are reduced to less than n packets and the less than n packets are sent during the handoff. If the difference is uncertain, then the n packets are expanded into more than n packets and the more than n packets are sent during the handoff.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the following detailed description, various techniques will be described in connection with the handoff of a mobile user from one network to another. A number of these techniques will be described in the context of a mobile communications device traveling through a circuit switched cellular network with one or more packet switched cellular network and/or wireless LANs dispersed throughout the cellular coverage region. The mobile communications device may be any suitable device capable of wireless telephony or data communications, such as a cellular phone designed for operation in a CDMA2000 1x network. The mobile communications device may be capable of employing any suitable protocol for accessing a wireless LAN, including, by way of example, IEEE 802.11. While these techniques may be described in the context of a cellular phone capable of communicating with an IEEE 802.11 network, those skilled in the art will readily appreciate that these techniques can be extended to other mobile communication devices capable of accessing multiple networks. For instance, these techniques may be applied to a mobile communications device capable of switching within or between a CDMA2000 network and a GSM/UMTS network. Accordingly, any reference to a cellular phone capable of communicating with an IEEE 802.11 network, or any other specific embodiment, is intended only to illustrate various aspects of the present invention, with the understanding that these aspects have a wide range of applications.

Figure 1A:
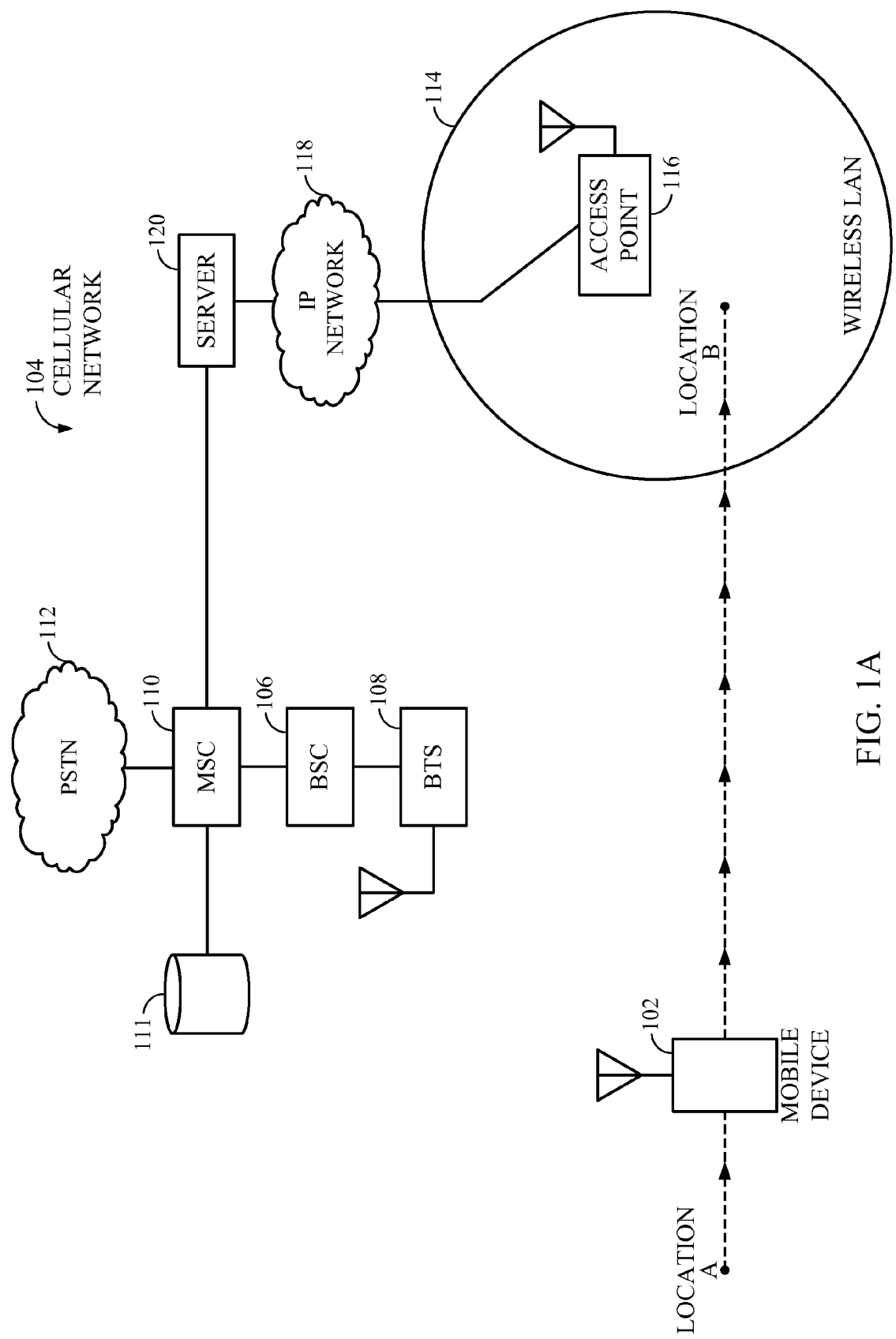
FIG. 1A is a conceptual block diagram of an embodiment of a wireless communications system.

FIG. 1A is a conceptual block diagram of an embodiment of a wireless communications system. A mobile device 102 is shown moving through a wide area cellular network 104 by a series of broken lines. The cellular network 104 includes a BSC 106 supporting a number of BTSs dispersed throughout the cellular coverage region. A single BTS 108 is shown in FIG. 1A for simplicity of explanation. A mobile switching center (MSC) 110 may be used to provide a gateway to a public switched telephone network (PSTN) 112 and may be coupled to a database 111. Although not shown in FIG. 1A, the cellular network 104 may employ numerous BSCs each supporting any number of BTSs to extend the geographic reach of the cellular network 104. When multiple BSCs are employed throughout the cellular network 104, the MSC 110 may also be used to coordinate communications between the BSCs.

One or more wireless LANs may be dispersed throughout the cellular coverage region of the cellular network 104. A single wireless LAN 114 is shown in FIG. 1A as an example of any of a variety of packet-switched networks that may communicate with the mobile device 102. The wireless LAN 114 may be an IEEE 802.11 network, or any other suitable network. The wireless LAN 114 includes an access point 116 for the mobile device 102 to communicate with an IP network 118. A server 120 may be used to interface the IP network 118 to the MSC 110, which provides a gateway to the PSTN 112. The server 120, also known as the interworking function, may be one or more separate systems providing various functions as described in more detail in FIG. 2. Additionally, FIG. 1A does not illustrate all the possible communication pathways between the different systems and networks.

When power is initially applied to the mobile device 102, it will attempt to access either the cellular network 104 or the wireless LAN 114. The decision to access a particular network may depend on a variety of factors relating to the specific application and overall design constraints. By way of example, the mobile device 102 may be configured to access the wireless LAN 114 when the service quality meets a minimum threshold. To the extent the wireless LAN 114 can be used to support mobile telephony and data communications, valuable cellular bandwidth may be freed up for other mobile users.

The mobile device 102 may be configured to continuously search for a beacon from the access point 116, or any other access point of a wireless LAN. The beacon is a periodic signal transmitted by the access point 116 with synchronization information. In the event that the mobile device 102 cannot detect a beacon, which might be the case if power is applied to the mobile device 102 at location A, then the mobile device 102 attempts to access the cellular network 104. The mobile device 102 may access the cellular network 104 by acquiring a pilot signal from the BTS 108. Once the pilot signal is acquired, a radio connection may be established between the mobile device 102 and the BTS 108 by means well known in the art. The mobile device 102 may use the radio connection with the BTS 108 to register with the MSC 110. Registration is the process by which the mobile device 102 makes its whereabouts known to the cellular network 104. When the registration process is complete, the mobile device 102 may enter into an idle state until a call is initiated, either by the mobile device 102 or the PSTN 112. Either way, an air traffic link may be established between the mobile device 102 and the BTS 108 to set up and support the call.

When the mobile device 102 moves through the cellular network 104 from location A to location B in the depicted embodiment, it is now able to detect a beacon from the access point 116. Once this occurs, a radio connection may be established between the two by means well known in the art. The mobile device 102 then obtains the IP address of the server 120. The mobile device 102 may use the services of a Domain Name Server (DNS) to determine the server's IP address. The domain name of the server 120 may be delivered to the mobile device 102 over the cellular network 104. With the IP address, the mobile device 102 can establish a network connection with the server 120.

Figure 1B:
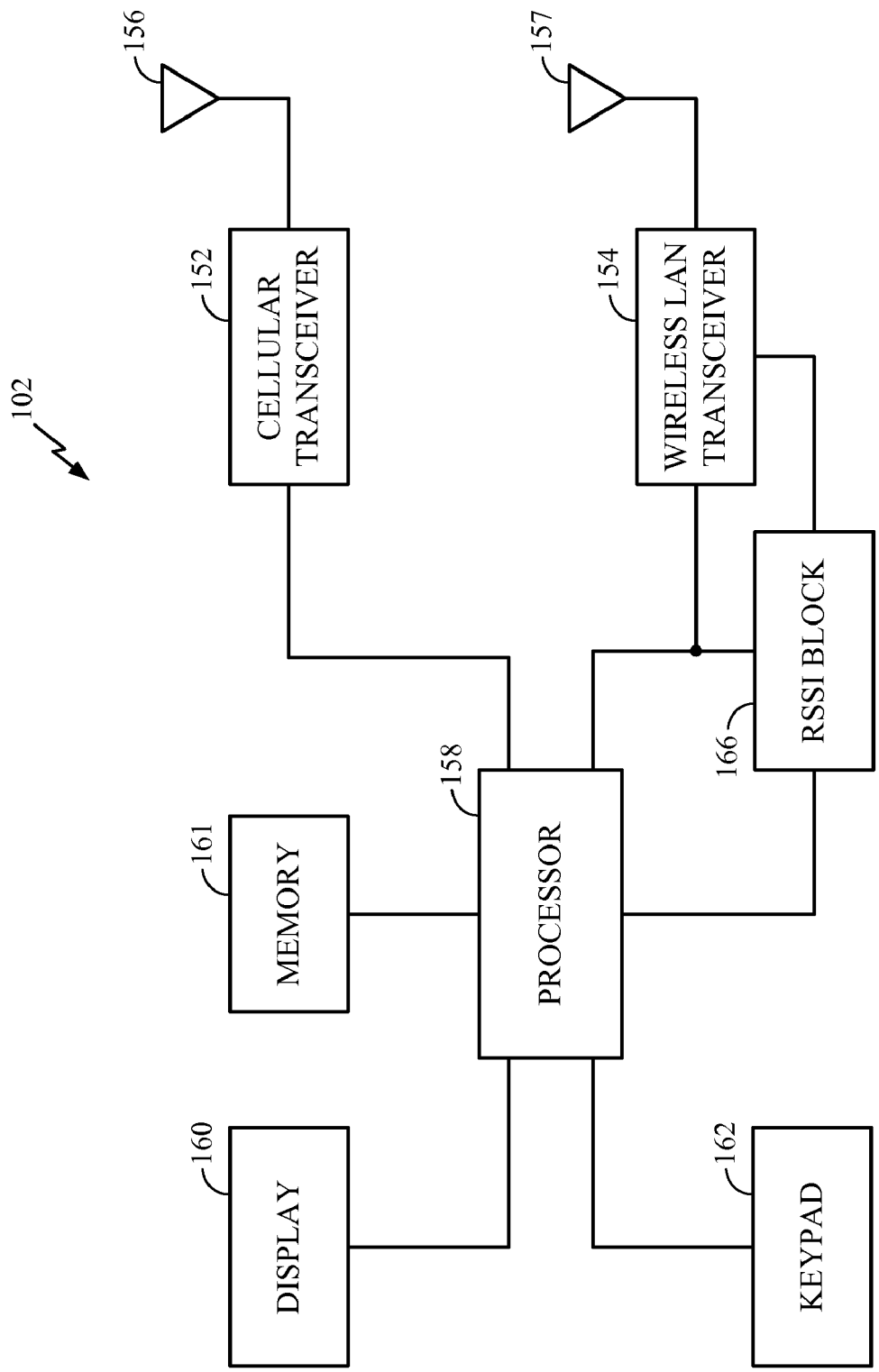
FIG. 1B is a functional block diagram illustrating an example of a mobile device capable of supporting both circuit switched cellular and wireless LAN communications.

FIG. 1B is a functional block diagram illustrating an example of a mobile device capable of supporting both circuit switched cellular and wireless LAN communications. The mobile device 102 may include a cellular transceiver 152 and a wireless LAN transceiver 154. In at least one embodiment of the mobile device 102, the cellular transceiver 152 is capable of supporting CDMA2000 1x communications with a BTS (not shown), and the wireless LAN transceiver 154 is capable of supporting IEEE 802.11 communications with an access point (not shown). Those skilled in the art will readily appreciate, however, that the concepts described in connection with the mobile device 102 can be extended to other cellular and wireless LAN technologies. Each transceiver 152, 154 is shown with a separate antenna 156, 157, respectively, but the transceivers 202, 204 could share a single broadband antenna. Each antenna 156, 157, 207 may be implemented with one or more radiating elements.

The mobile device 102 is also shown with a processor 158 coupled to both transceivers 202, 204, however, a separate processor may be used for each transceiver in alternative embodiments of the mobile device 102. The processor 158 may be implemented as hardware, firmware, software, or any combination thereof. By way of example, the processor 208 may include a microprocessor (not shown). The microprocessor may be used to support software applications that, among other things, (1) control and manage access to the cellular network and wireless LAN, and (2) interface the processor 158 to the keypad 160, display, 162, and other user interfaces (not shown). The processor 158 may also include a digital signal processor (DSP) (not shown) with an embedded software layer that supports various signal processing functions, such as convolutional encoding, cyclic redundancy check (CRC) functions, modulation, and spread-spectrum processing. The DSP may also perform vocoder functions to support telephony applications. The manner in which the processor 158 is implemented will depend on the particular application and the design constraints imposed on the overall system. Those skilled in the art will recognize the interchangeability of hardware, firmware, and software configurations under these circumstances, and how best to implement the described functionality for each particular application.

For certain purposes known in the art, the signal strength from the access point may be measured at the mobile device 102 with a received signal strength indicator (RSSI) block 166. The RSSI is most likely an existing signal that is fed back to the wireless LAN transceiver 152 for automatic gain control, and therefore, can be provided to the processor 158 without increasing the circuit complexity of the mobile device 102. Alternatively, the quality of the radio connection may be determined from the beacon.

The processor 158 may be configured to execute an algorithm to detect when handoff conditions exist and to initiate appropriate signaling with other connected systems. The algorithm may be implemented as one or more software applications supported by the microprocessor based architecture discussed earlier and stored in the accessible memory 161. Alternatively, the algorithm may be a module separate from the processor 158. The module may be implemented in hardware, software, firmware, or any combination thereof. Depending on the specific design constraints, the algorithm could be integrated into any entity in the mobile device 102, or distributed across multiple entities in the mobile device 102.

Figure 2:
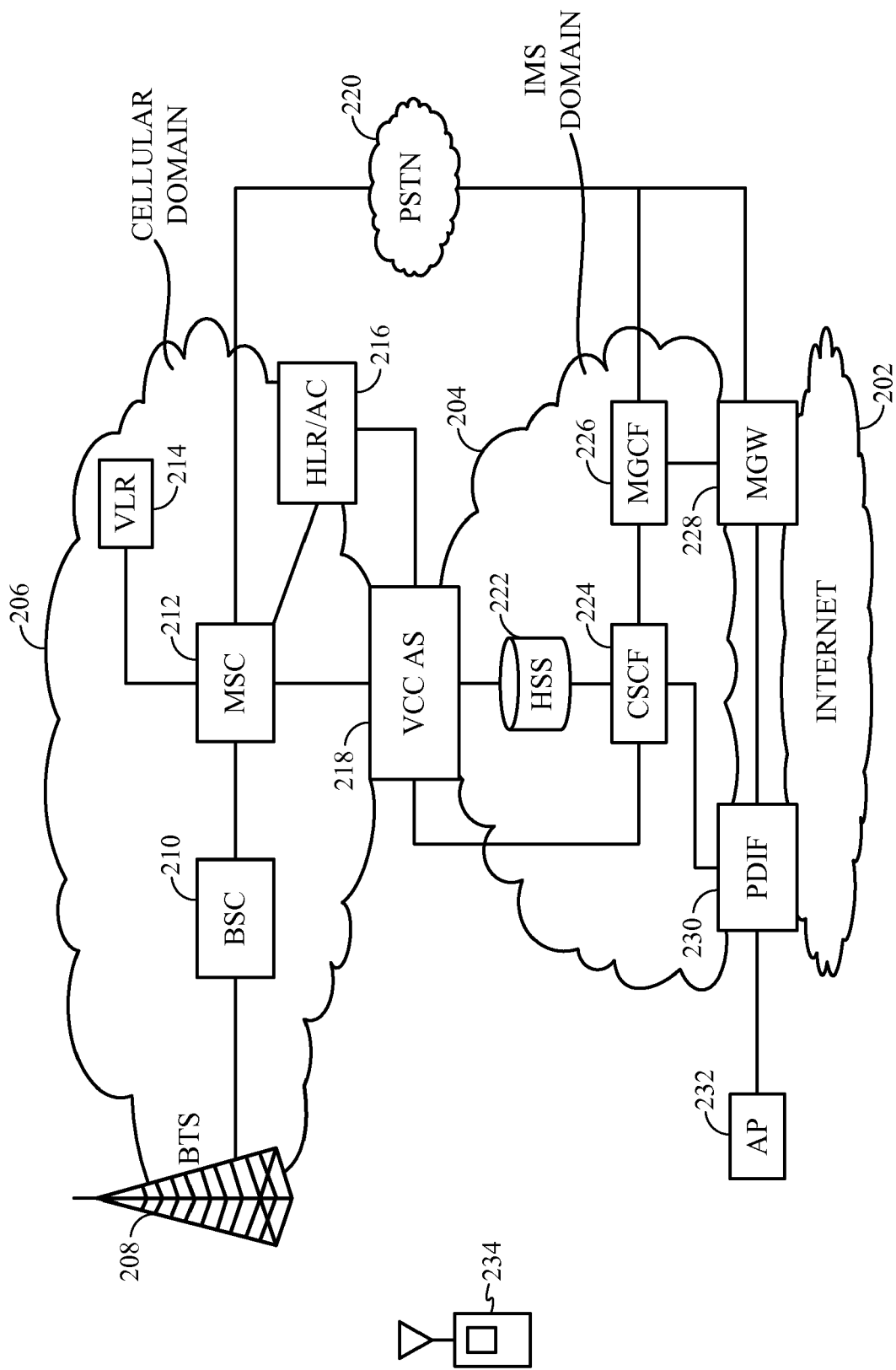
FIG. 2 depicts a more detailed conceptual block diagram of the gateway system of FIG. 1A.

To facilitate voice communications between a packet network and a circuit-switched network, such as the PSTN 112, the resources of the system 120 are utilized. Details of some functions or components of the system 120 are shown in more detail in FIG. 2. The system 120 of FIG. 1A is more comprehensively described as an IP Multimedia Subsystem (IMS) domain 204 as depicted in FIG. 2. The IMS domain has a number of different systems providing the following functions, for example: servers providing IP based services such as SIP servers and SIP registrars (known as Call Session Control Function, CSCF) 224, servers providing interworking with legacy PSTN networks such as MGCF 226 and MGW 228, servers providing interworking with CS cellular networks such as VCC AS 218. Also, a plurality of multimedia Application servers (not shown) can be included that provide different services to the mobile device 234 via the Internet 202. The specific servers identified in FIG. 2 are exemplary in nature and fewer or more servers can be included without departing from the scope of the present invention. In general, one function of the IMS domain 204 is that of mapping signaling and voice communications between the packet-switched network 206 and a circuit-switched network to thereby permit communications between the two. The IMS domain 204 may, for example, provide a SIP based network connection for a mobile device 234. The Session Initiation Protocol (SIP) is a signaling protocol used for establishing sessions in an IP network. A session could be a simple two-way telephone call or it could be a collaborative multi-media conference session. The ability to establish these sessions means that a host of innovative services become possible, such as voice-enriched e-commerce, web page click-to-dial, Instant Messaging with buddy lists, and IP Centrex services. Some other aspects illustrated by FIG. 2 is the inclusion of the HSS server 222 which is the home subscriber server and serves the same function as the HLR 216 in legacy circuit switched networks; and the connection between the PSTN 220 and the IMS domain 204. In the FIG. 2 also shown is a path between BSC (210) and Voice Call Continuity Application server (VCC AS) 218 through the MSC 212. On the wireless LAN side, the device 234 may use an access point 232 to reach a packet domain interface 230 within the IMS domain 204.

The other cellular network elements in FIG. 2 have been described previously such as the BTS 208, the BSC 210, the MSC 212, the VLR 214, the HLR/AC 216 and the PSTN 220. The mobile device 234 can access both the cellular network and a packet switched network, such as a wireless LAN, using the packet data interface 230 through the network access point 232.

In particular, the IMS domain may include a media gateway 228 that converts transmissions between a packet stream from the IP network and the voice circuit-switched network such as the PSTN 220. Thus, voice is carried in packets over the packet-switched network and the media gateway 228, while voice is carried over voice encoded communication circuits in a circuit-switched connection between the media gateway 228 and the PSTN 220. A media gateway control function (MGCF) 226 is also provided that operates to terminate SIP signaling and control functions of the media gateway 228. In this regard, the MGCF 226 typically performs conversion between SIP signaling in the IP session and SS7 signaling in the circuit-switched session.

A voice call continuity application server (VCC AS) 218 is also provided that anchors certain communication sessions.

The VCC AS is part of a service that a network operator may provide to its subscribers. This service may be automatically included as a service or be a subscription service which a user must select and possibly pay additional fees for its capabilities. Original designs of a multimode network such as that in FIG. 1A envisioned that each time a mobile device initiated a circuit-switched call, then (if they are a subscriber to the VCC service) that call session would be anchored at the VCC AS upon call initiation. Anchoring involves the VCC AS storing sufficient information to restore or handoff a session if it becomes necessary. Typically such information includes the identity of the two parties participating in the session, the services being utilized during the session, and any transport specific information that is useful in defining the state of the network and the call during the session. Such a design automatically anchors all calls upon initiation regardless of whether that call ever actually requires handoff. Accordingly, resources of the VCC AS 218 are used for calls that do not require its functionality. Additionally, the procedure of anchoring the call adds a delay to the setup of the circuit-switched session which may be noticeable to a user.

The details of FIG. 2 are depicted as functional blocks and may be physically implemented in a variety of different ways. Each functional block may be one or more separate computer-based platforms for executing appropriate software or they may be logical functions of an application executing on the same computer-based platform. Also, the specific arrangement and inclusion of functional blocks in FIG. 2 is exemplary in nature and not all functional blocks are necessary in order to transmit and receive VoIP packets in accordance with the principles described herein. In general, the device 234 may be involved with a telephone call using the WiFi access point 232 and, as such, receive VoIP packets from the MGW 228. When the device 234 determines a hand-over to the cellular network 206 is advantageous, then the MGW 228 also begins transmitting frames via the cellular network. In the other direction, the device 234 itself may transmit both VoIP packets and cellular frames as well. At some point during the hand-over process, the device 234 stops using the VoIP packet stream for playback to the user and begins using the cellular frame stream.

Figure 3A:
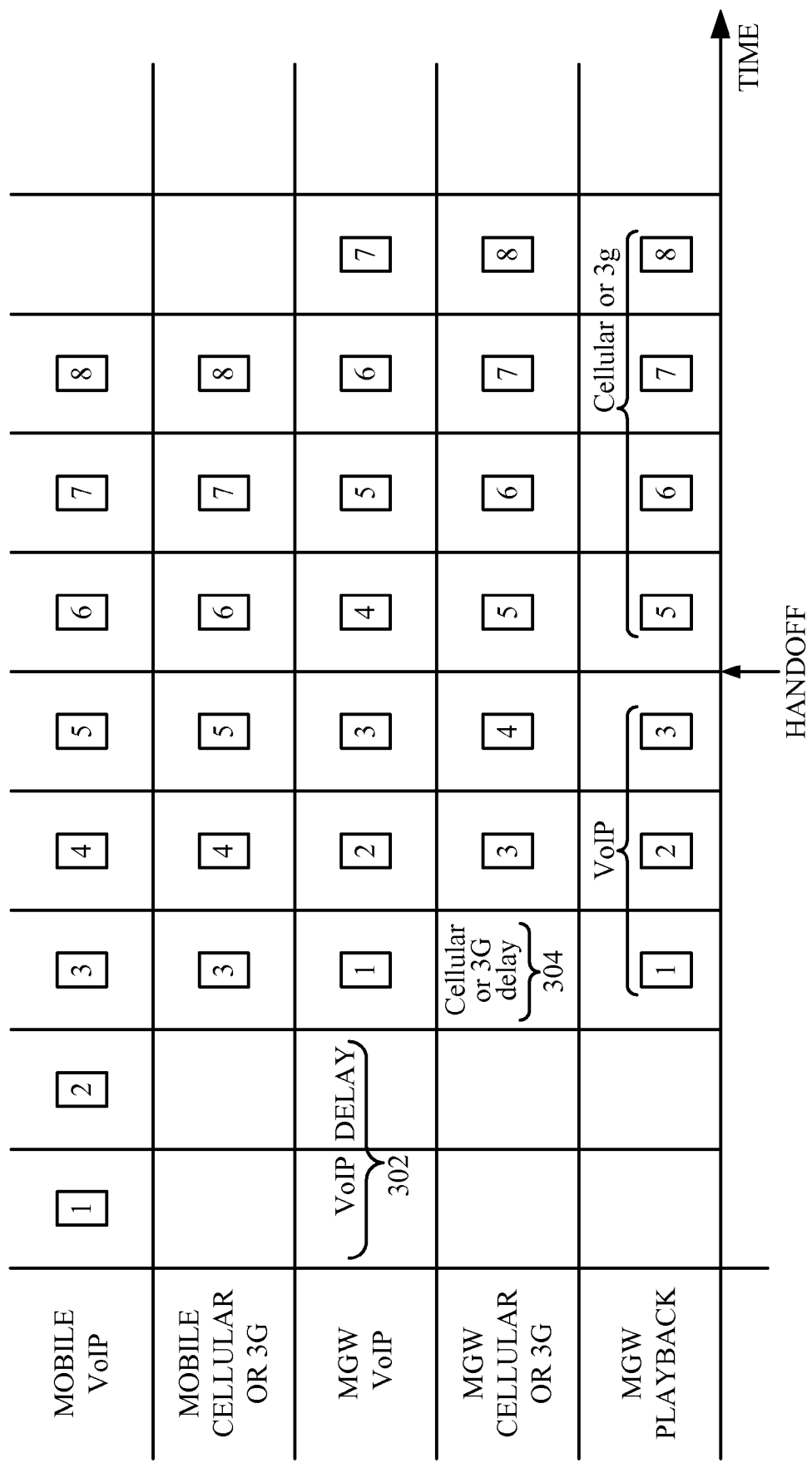
FIG. 3A and FIG. 3B depict respective time charts illustrating unintended artifacts that may occur during hand-over from one network to another.
Figure 3B:
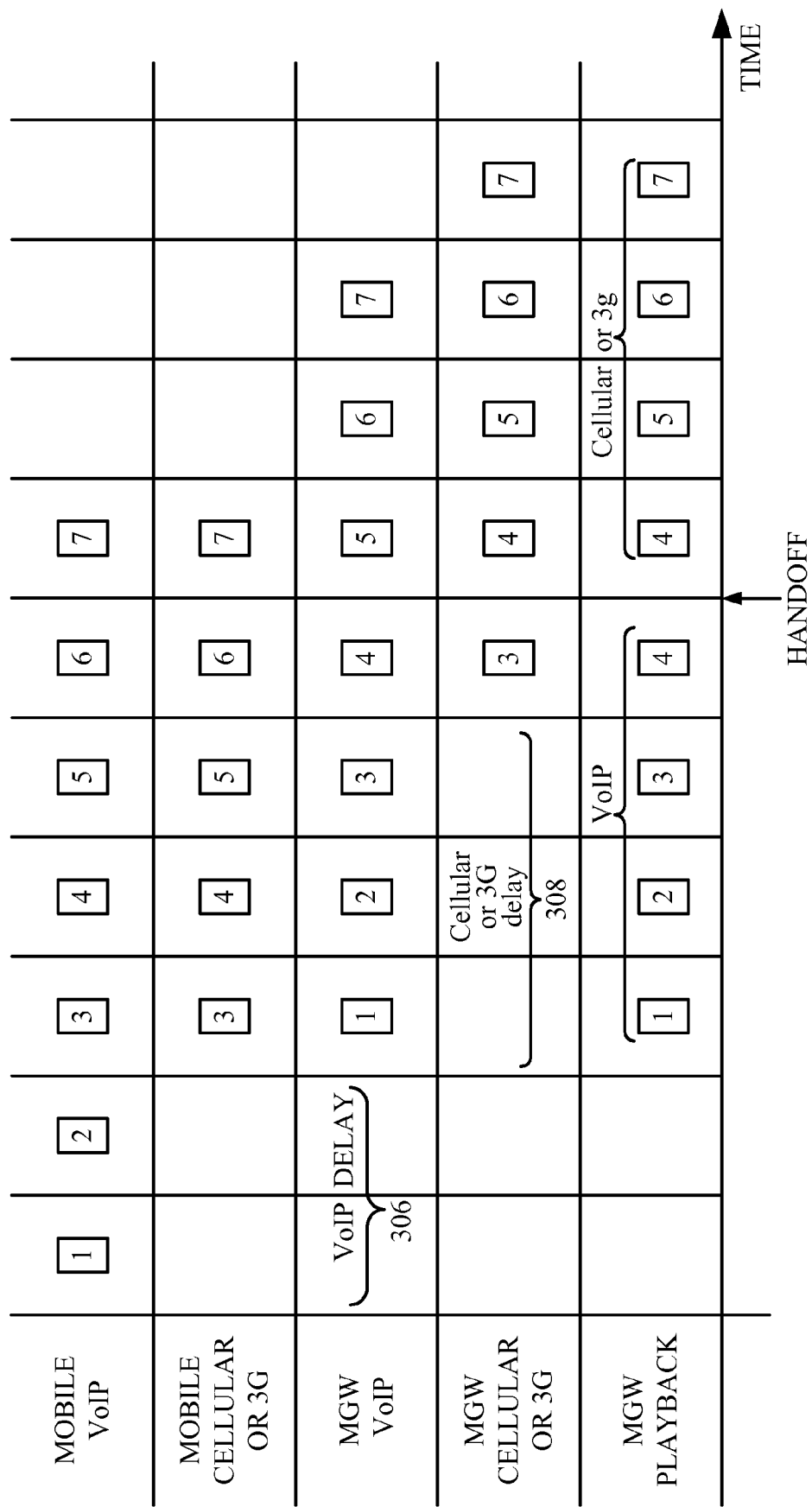

FIGS. 3A and 3B illustrate the voice artifacts that may arise because of different delay periods for the circuit switched communications path as compared to the VoIP communications path, such as a WiFi network. These exemplary figures depict the mobile handset transmitting a frame or packet and the MGW receiving the frames and packets. The principles and techniques described herein may additionally be utilized in the reverse direction as well, where the MGW is transmitting and the mobile handset is receiving. The chart of FIG. 3A shows, in the top two rows, frames or packets that are transmitted from a mobile handset. As described previously, the mobile handset may transmit VoIP packets as well as circuit-switched frames. In addition to circuit-switched frames, the principles and techniques described herein are applicable and effective for packet-switched frames as well such as in a cellular or 3G network. Each packet or frame typically is 20 ms in duration and carries voice information for an ongoing telephone call. During a soft hand-over process, the mobile handset concurrently transmits both VoIP packets and cellular or 3G frames for some period of time. The next two rows of the chart depict the reception of these packets and frames at the MGW.

However, the delay in the cellular communications path may be different from the delay in the VoIP communications path. For example, in FIG. 3A, the VoIP delay 302 is longer in duration than the cellular delay 304. As a result, various artifacts may be introduced into the playback stream that a user hears from a mobile handset or access terminal. One unintended and unwanted artifact in FIG. 3A is that at handover, when the MGW switches from the VoIP stream of packets to the cellular stream of frames, frame/packet number "4" is dropped. FIG. 3B depicts a situation in which the VoIP delay 306 is smaller than the cellular delay period 308. In this case, packet/frame number 4 is played twice during the handover process.

Well-known techniques for addressing jitter and other concerns in VoIP transmission involves time-warping the packets so that a 20 ms packet may actually playback for more or less than 20 ms. These techniques are performed in such a way that the expansion or contraction of a packet is accomplished without a discernible effect to the listener. As described in detail below, these techniques for expanding VoIP packets are now used to address the unwanted artifacts illustrated in FIGS. 3A and 3B. Typically, the VoIP packet is expanded to be approximately 150% to 200% of its original duration. For example, a 20 ms VoIP packet may be expanded to last approximately 30 to 40 ms. These expansion rates are exemplary in nature and other expansion rates are contemplated as well.

As mentioned, there are differences in delay on the two voice stream paths (i.e., the cellular or 3G path and the VoIP over WLAN path) between the mobile handset at the MGW. The cellular or 3G path can involve either circuit-switched voice or packet switched VoIP over 3G packet-switched data (e.g. 1xEVDO or UMTS HSPA). To address this issue for the downlink voice flow, time-warping to compensate for the delay difference can be implemented at the mobile handset. Also, for the uplink voice flow, it is advantageous to be able to use an unmodified MGW, and therefore implement handset algorithms at the source to compensate for any delay differential. It is worth noting that the same differential delay scenario arises if the other end is a VoIP phone or a soft-phone that is unaware of differential delays due to handoff.

Figure 3C:
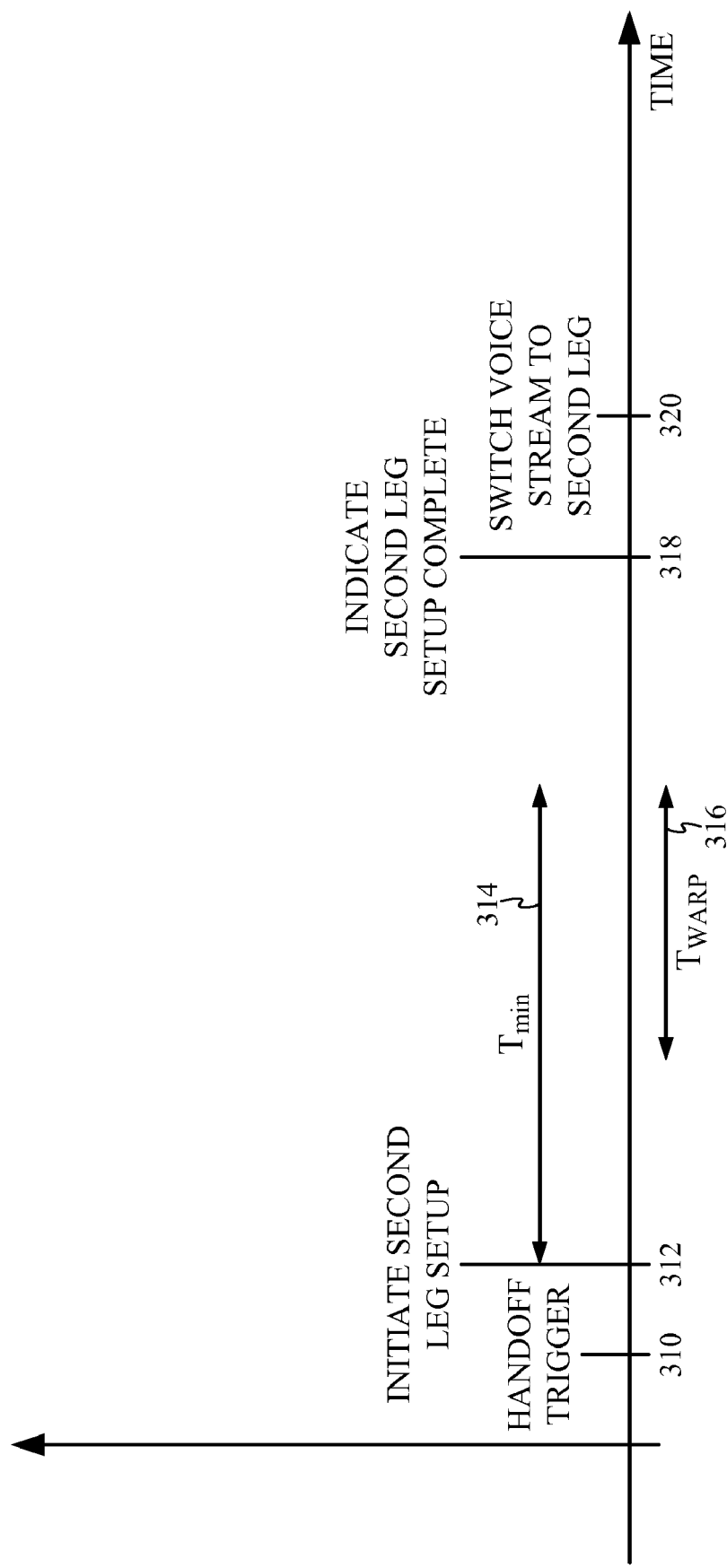
FIG. 3C depicts a timeline of a call handoff from the time a trigger handoff occurs until a voice stream is switched to the second leg.
Figure 3D:
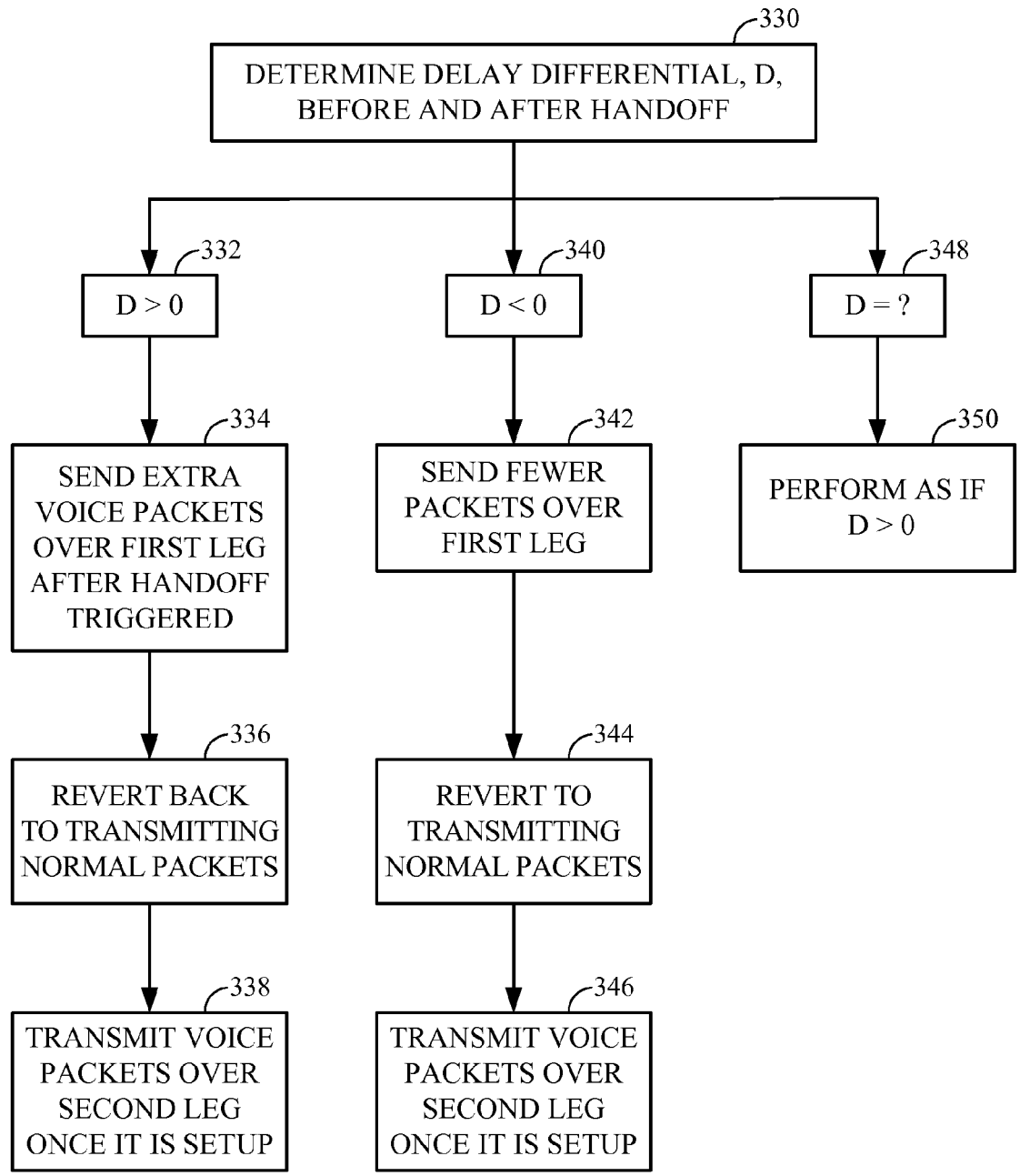
FIG. 3D depicts a flowchart of an exemplary method for a packet transmitter to expand packets during transmission

The exemplary method described with respect to FIGS. 3C and 3D involve a handoff-aware device that compensates for the differential delay at the source. In other words, the implementation is confined to the sender-side and no changes are required at the receiver. This exemplary method is distinguished from an alternative method described later in that in this first method there is no simultaneous transmission of packets on both the first (pre-handoff) leg and the second (post-handoff) leg. As a result, there is no need for marking and identification of packets as provided for in the later method nor is there a need to modify the MGW in any way.

In operation, the MGW or remote VoIP phone typically includes a jitter buffer to compensate for delay variations over the Internet. Typical sizes of such a buffer would maintain the jitter buffer at approximately 100 ms. When a cellular call setup is implemented as a part of VoIP over WLAN to cellular handoff, the cellular leg setup delay is up to $T_{3G}$ ms once the handoff is triggered. Typical values of $T_{3G}$ are in the range 3000 to 5000 ms.

When a VoIP over WLAN call setup is implemented as a part of cellular to VoIP over WLAN handoff, the VoIP over WLAN leg setup delay is up to $T_{WL}$ ms once the handoff is triggered. Typical values of $T_{WL}$ are in the range 3000 to 5000 ms. These values are exemplary only; for example, call setup may be much faster if the mobile is already associated with the WLAN. This occurrence is not rare because in many instances the mobile has enough time to associate with the WLAN and then begin the handoff procedure. In this case, the call setup time for the WLAN call will be lower.

The delay on the VoIP over WLAN path to the remote end (MGW or remote VoIP phone) is $D_{WL}$ ms. On the cellular network, the voice delay is $D_{3G}$ ms. Typical values of these one-way delays are in the range of 50-200 ms. Depending on the direction of handoff, i.e., WLAN to cellular or cellular to WLAN, the one-way voice delay can be greater either before or after handoff. That is, if the one-way delay before handoff is $D_0$ and the one-way delay after handoff is $D_1$, then the delay differential $D=D_1-D_0$ may be either positive or negative.

FIG. 3C depicts a timeline of a voice stream from the time of handoff trigger until switchover. In particular, the handoff trigger 310 is detected and this initiates, at time 312, the setup of the second leg. There is a time period 314, $T_{min}$, that is the known minimum time for setup of the second leg. At sometime after that, at time 318, the second leg setup is complete and an indication of such is determined. Once this occurs, the voice stream can be switched, at time 320, to the second leg. During the period between the initiation of the second leg and the indication that it is setup, a time period 316, $T_{warp}$, occurs in which time-warped voice packets are sent. The specific duration of $T_{warp}$, can vary without departing from the scope of the present invention. For example, the duration may be chosen to be a certain percentage of $T_{min}$, such as, for example, 1000 ms may be selected for the time warping period if the minimum leg setup time is known to be around 5000 ms.

FIG. 3D depicts a flowchart of an exemplary method for sending time-warped packets in accordance with the principles of the present invention. The first step, 330, is to determine from, a priori knowledge, what the differential delay, D, is for the call transfer being accomplished. This value may be greater than zero, step 332; less than zero, step 334; or indeterminate, step 348.

Case 1 D>0

When D is positive, the delay post-handoff is greater than the delay pre-handoff. To address this delayed arrival of voice packets after handoff, extra voice packets may be sent over the first leg, after the handoff is triggered on the second leg and while the second leg is being setup.

Assuming that the minimum leg setup delay is known (for example, $T_{min}$=3000 ms is a typical value although other values are contemplated as well), the handset starts sending, in step 334, extra voice packets over the first leg starting at time $T_{min}-T_{warp}$ ms. For example, if $T_{warp}$=1000 ms, and the handset sends 10% additional voice packets through time-warping, then over the warping period of 1000 ms, the handset would send 55 voice packets instead of the normal 50. For example, if the vocoder is using 20 ms framing, then by extending 18 ms segments of speech into a 20 ms coded speech segment, and transmitting such a warped voice packet every 18 ms, the 10% additional voice packets can be achieved. One of ordinary skill will recognize that 10% is an exemplary number and also that other specific values besides 20 ms and 18 ms are contemplated as well.

In accordance with this method, the jitter buffer at the receiver (MGW or at the VoIP phone) would grow with these 5 excess packets, because the playout continues at its normal rate, for example, at 50 packets per second. (It is possible, that the receiver jitter buffer overflows and some of these packets are discarded).

After completion of the warping period, $T_{warp}$, the handset reverts, in step 336, back to transmitting normal VoIP frames at its normal rate such as, for example, every 20 ms, and awaits the completion of setup of the second leg. As soon as the second leg is set up, the handset stops transmitting voice packets on the first leg and starts transmitting voice packets on the second leg, in step 338. For the period of excess delay D, no packets will arrive at the receiver but the receiver will be able to consume the extra voice packets in the jitter buffer.

Case 2 D<0

When the differential delay, D, post handoff is negative, the jitter buffer will grow post-handoff. This is a problem is simpler to address than a jitter buffer underflow in the case of D>0 and can also be addressed by sender side time warping.

As before, assuming that the minimum leg setup delay is known such as, for example, known to be $T_{min}$=3000 ms, the handset starts sending, in step 342, fewer voice packets over the first leg starting at time $T_{min}-T_{warp}$ ms. For example if $T_{warp}$=1000 ms (and packets were 20 ms) and the handset sends 6% fewer voice packets through time-warping, then the handset would thus send 47 voice packets instead of the normal 50 during this time period. For example, if the vocoder is using 20 ms framing, then by compressing 21 ms segments of speech into a 20 ms coded speech segment, and transmitting such a warped voice packet every 21 ms.

The jitter buffer at the receiver (MGW or at the VoIP phone) would shrink by 3 packets, because the playout would continue at the normal 50 frames per second.

After completion of the warping period, the handset reverts, in step 344, back to transmitting normal VoIP frames every 20 ms, and awaits the completion of setup of the second leg. As soon as the second leg is set up, the handset stops transmitting voice packets on the first leg and starts transmitting voice packets on the second leg, in step 346. At the receiver, voice packets on the second leg start arriving even before the last packet has been received on the first leg. Since the handset transmitted voice packets sequentially on the first leg and then moved to the second leg (and no voice packets were transmitted on both legs), the receiver places voice packets received on the second leg after the last packet received on the first leg.

Case 3 D May be Negative or Positive

The above strategies are applicable when the sign of D is known, even if the precise value is unknown. When the handset is not aware of which one-way delay pre- or post-handoff is larger, the sign of D is unknown. In this case, since a jitter buffer underflow (resulting in a gap in playout) is less desirable, the handset preferably follows the procedure for D>0, in step 350.

In the method described above, the handset includes the capability to be able to detect when to switchover transmission of voice packets from the first (pre-handoff) leg to the second (post-handoff) leg. Thus, the two end points are able to detect when the link setup on the second leg is complete. One simple alternative is for the network to provide such an indication to the handset. As soon as such an indication is received, the handset initiates a switchover and begins transmitting subsequent voice packets over the second leg.

In some cases, the network indication may be unreliable. For example, in 3G networks today, the network often indicates to the handset that the leg setup is complete even before the response from the remote end is received. If the handset initiated the switchover at this point, voice packets on the second leg may potentially be lost. One method to address this risk is for the handset to wait until a voice packet is received on the second leg (which would indicate that the setup of the second leg is complete) before initiating the switchover. A second method is for both ends to indicate (for example through an in-band message or an in-band DTMF tone) to each other when the second leg setup is complete. The switchover is initiated by the handset after this indication is received from the other end. This latter scheme is advantageous in that it would work even in the case when both ends were implementing this mechanism.

Figure 4:
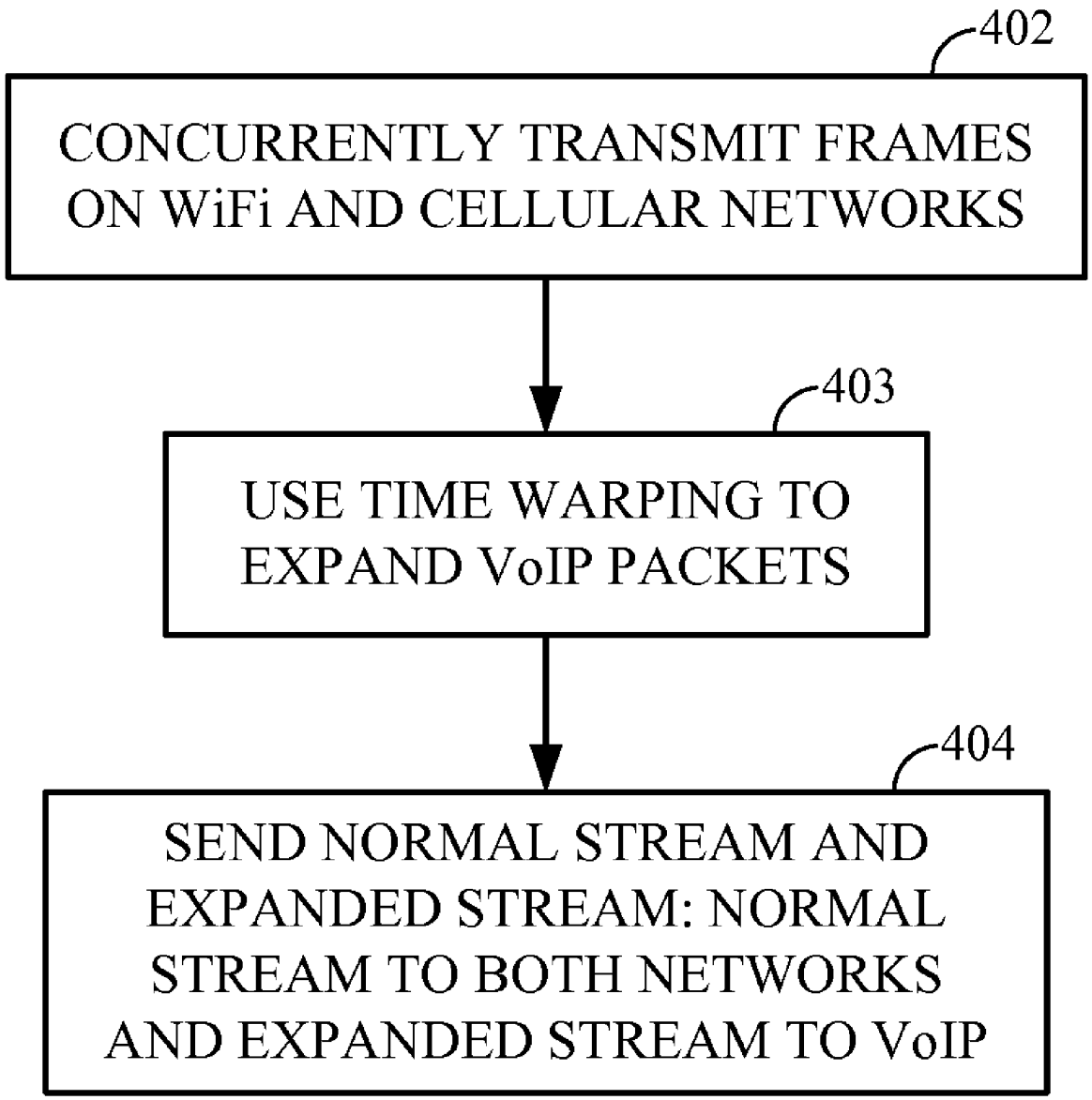
FIG. 4 depicts a flowchart of another exemplary method for a packet transmitter to expand packets during transmission.

FIG. 4 depicts a flowchart of an alternative exemplary method for a receiver to incorporate packet expansion in order to reduce unwanted artifacts during hand-over from a WiFi network to a circuit-switched or packet-switched network such as a cellular network or 3G network. Unlike the previous method described above, this alternative method relies on both the sender's and the receiver's knowledge of the time warped packets. In this example, the transmitter is considered to be the mobile handset and the receiver is the media gateway. Of course, these roles could be reversed without departing from the scope of the present invention. In step 402, the mobile handset determines that a hand-over is going to take place and starts to concurrently transmit frames over both the WiFi network as well as the cellular network. At this point, in step 403, the mobile handset begins to transmit expanded VoIP packets as well. Thus, as shown in step 404, the mobile handset is transmitting normal packets in the WiFi network, normal frames in the cellular network and expanded packets in the WiFi network. One exemplary method for differentiating expanded packets and normal packets is by utilizing one of the header fields in the VoIP packet. For examples, the SSRC field may have one value for normal packets and a different value for expanded packets.

The mobile handset should determine how long to transmit both expanded packets and normal packets. In the worst-case scenario, the mobile handset may send the two streams of packets for the delay differential between the two types of networks. This may require some type of monitoring and analysis in order to calculate the delay differential. Accordingly, one alternative may be to simply assume the delay on the downlink and uplink are symmetrical and use the downlink delay as the duration for sending expanded packets.

One exemplary technique for measuring the downlink delay differential is for the MGW to use the Real Time Transport Protocol (RTP) so that the mobile handset can use the received packets to estimate the delay differential in the downlink direction. The mobile handset can then assume that the uplink delay differential is the same in order to determine how long to send the expanded packets.

Figure 5:
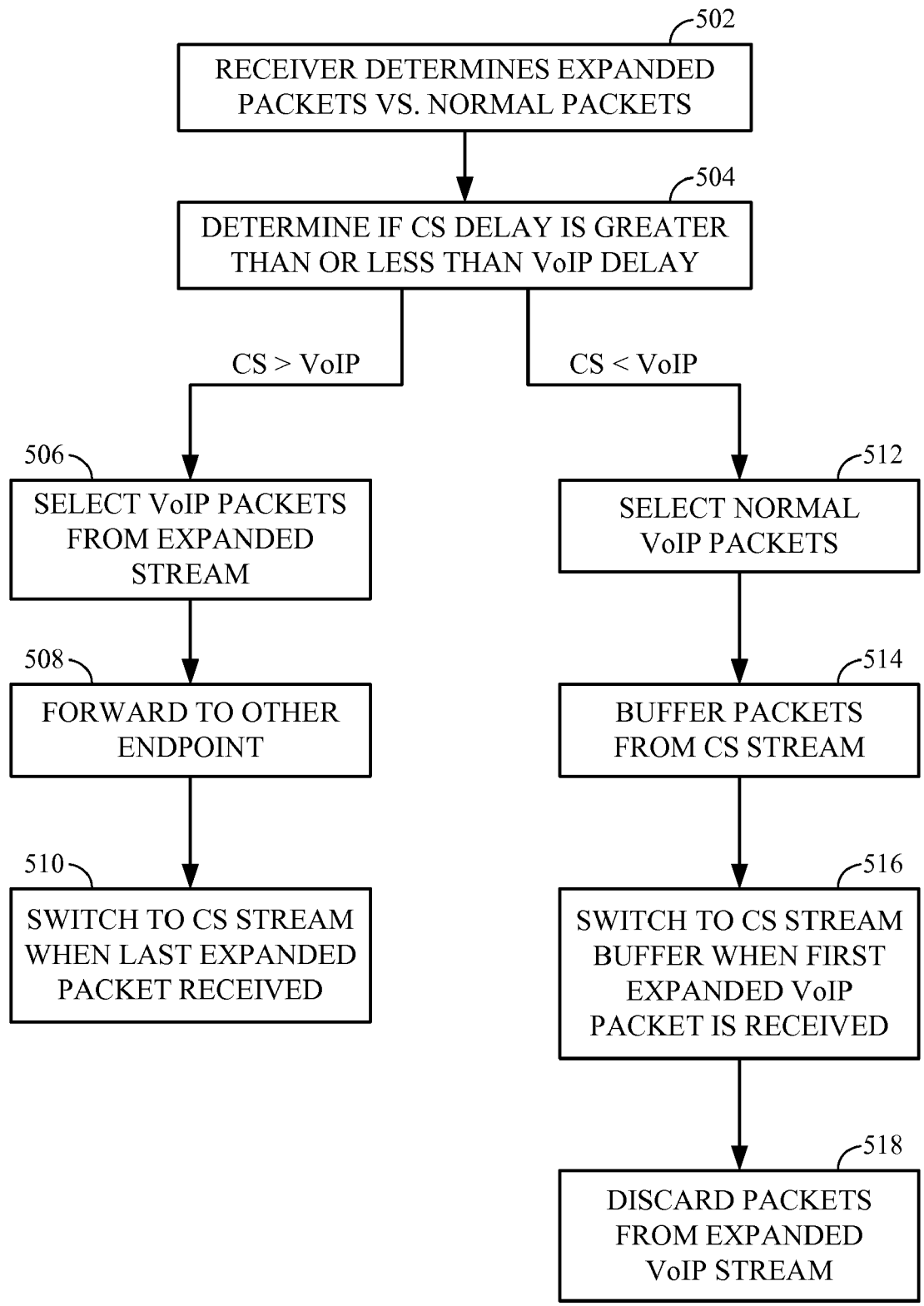
FIG. 5 depicts a flowchart of an exemplary method for a receiver of packets to select the order of playing back received packets and frames.

FIG. 5 depicts a flowchart of an exemplary method for receiving time-expanded VoIP packets during a hand-over from a WiFi network to a cellular network. In step 502, the receiver determines, from all the incoming packets, which are expanded VoIP packets and which are normal VoIP packets. Next, in step 504, the receiver determines whether the cellular network delay or the WiFi network delay is greater. This determination may be made as an initial step to the process or can be performed periodically. However, there is little likelihood that the respective delays will change dramatically during the brief hand-over period and so step 504 is preferably performed once during each hand-over.

The left-hand branch of the flowchart illustrates the steps that occur at the receiver if the cellular network delay is greater than the VoIP network delay. Also, the inclusion of step 508 to forward packets assumes that the receiver is a MGW. If the receiver is the mobile handset, then no packet forwarding need occur. In step 506, the receiver detects that expanded VoIP packets begin arriving (e.g., via the header information) and these expanded packets are used for playback. In step 510, when the last expanded VoIP packet arrives, the receiver switches to the cellular frame stream. As a result, (referring back to FIG. 3A, the artifact of playing back the same frame/packet twice will no longer occur. By the time the series of expanded VoIP packets are played back, the delayed cellular frames will be ready to be played back in the correct order.

The right-hand branch of the flowchart illustrates the steps that occur when the cellular network delay is less than the VoIP delay. In this instance, the receiver continues to receive and playback the normal VoIP packets, in step 512, that are received. The incoming cellular frames are buffered, in step 514. When the receiver detects that the first expanded VoIP packet is received, in step 516, then the buffer of cellular frames are used for playback. Accordingly, when the first expanded packet is detected, instead of playing back the next VoIP packet, the receiver plays back the first cellular frame in the buffer which is sequentially the correct frame to play back. This alleviates the artifact of FIG. 3B where a frame/packet is missed during playback.

Figure 6:
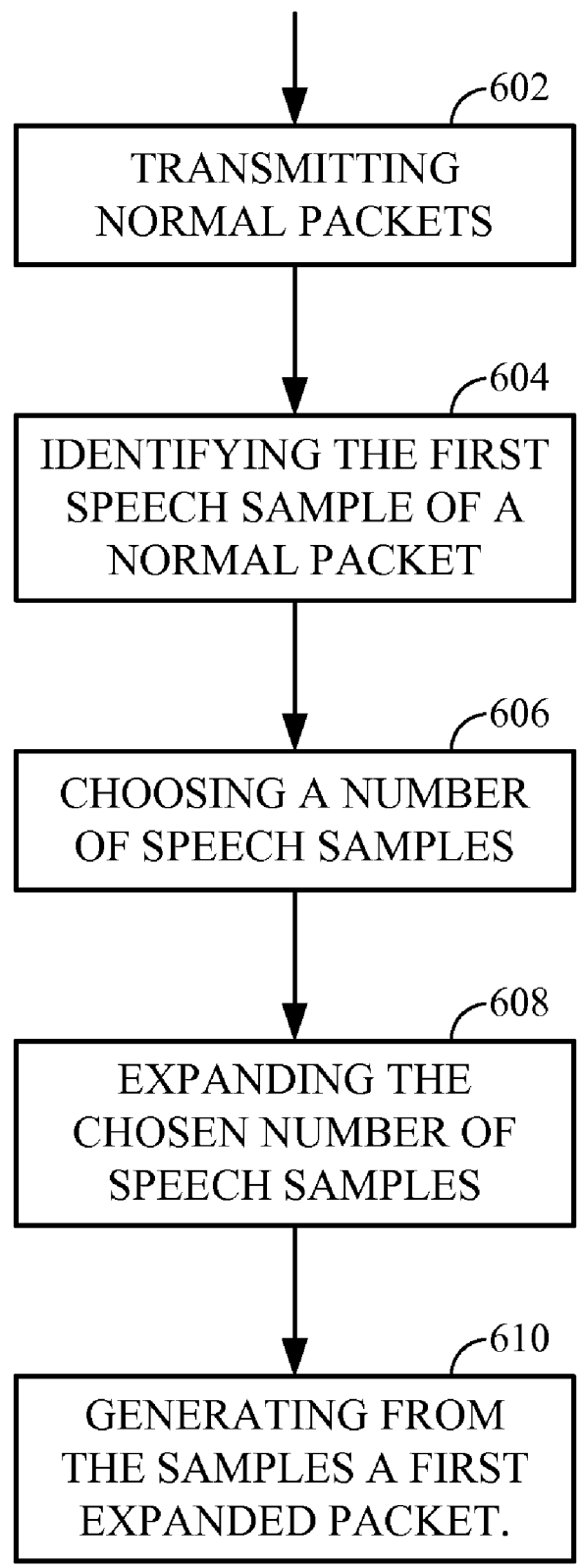
FIG. 6 depicts a flow chart of an exemplary method for transmitting in a mobile communications device capable of communicating over multiple access networks.

FIG. 6 depicts a flow chart of an exemplary method for transmitting in a mobile communications device capable of communicating over multiple access networks. In step 602, normal packets, created from a stream of speech samples over a first network, are transmitted. In step 604, the first speech sample of a one normal packet that will correspond in time to a first packet to be transmitted to a second network is identified. In step 606, a certain number of consecutive speech samples beginning with the first sample are chosen. In step 608, the chosen number of speech samples is expanded. In step 610, a first expanded packet for transmitting over the first network is generated from these samples.

Figure 7:
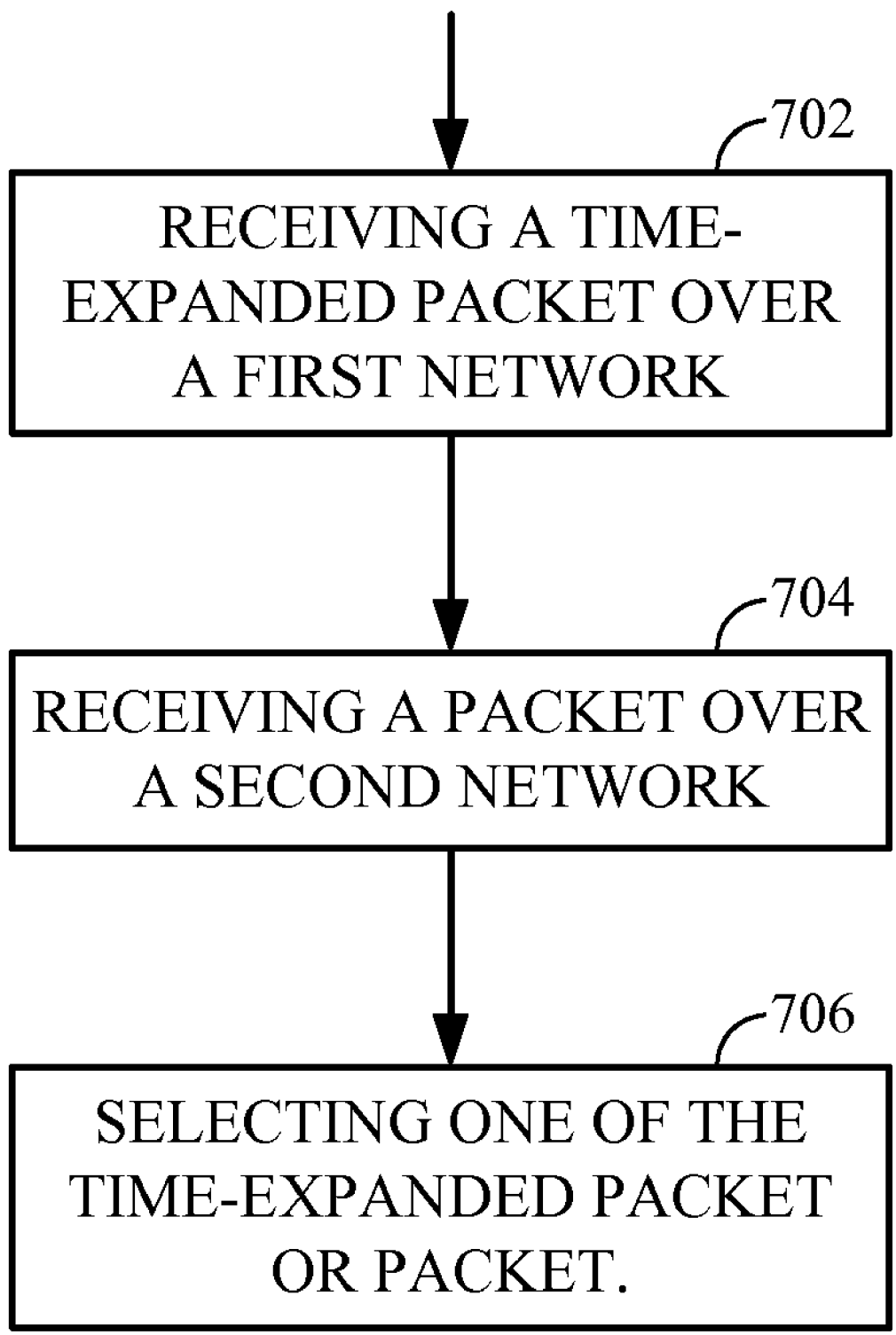
FIG. 7 depicts a flow chart of an exemplary method for receiving in a communications device capable of communicating over multiple access networks.

FIG. 7 depicts a flow chart of an exemplary method for receiving in a communications device capable of communicating over multiple access networks. In step 702, a time-expanded packet is received over a first network. In step 704, a packet is received over a second network. In step 706, one of the time-expanded packet or the packet is selected for output based on a differential communications path delay between the first network and the second network.

Figure 8:
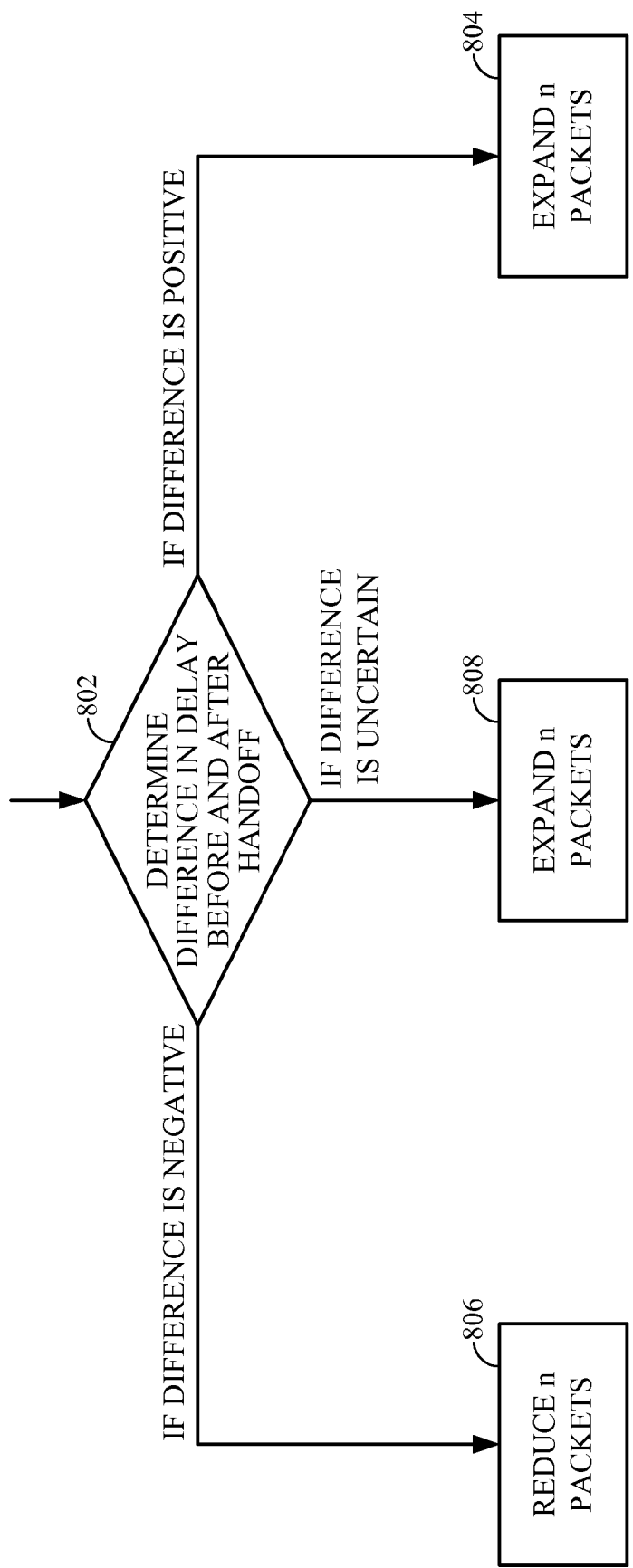
FIG. 8 depicts a flow chart of an exemplary method for sending n packets, from a sender to a receiver, during a handoff between a first leg and a second leg.

FIG. 8 depicts a flow chart of an exemplary method for sending n packets, from a sender to a receiver, during a handoff between a first leg and a second leg, where n is an integer greater than 1. In step 802, a difference between a) a first delay between sender and receiver before the handoff and b) a second delay between sender and receiver after the handoff is determined. If the difference is positive, then in step 804, the n packets are expanded into more than n packets and the more than n packets are sent during the handoff. If the difference is negative, then in step 806, the n packets are reduced to less than n packets and the less than n packets are sent during the handoff. If the difference is uncertain, then in step 808, the n packets are expanded into more than n packets and the more than n packets are sent during the handoff.

Figure 9:
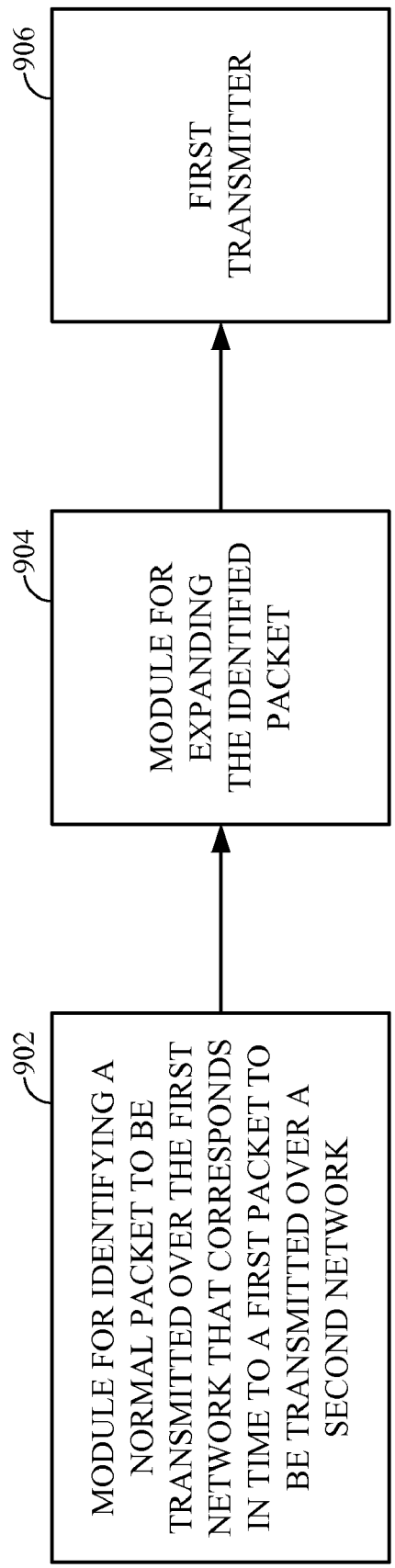
FIG. 9 depicts a functional block diagram of an exemplary mobile communications device capable of communicating over multiple access networks.

FIG. 9 is a functional block diagram illustrating an exemplary of mobile communications device capable of communicating over multiple access networks. The mobile communications device 102 includes a first transmitter 906 configured to transmit normal packets and expanded packets over a first network. The mobile communications device 102 also includes a module 902 for identifying a one of the normal packets to be transmitted over the first network that corresponds in time to a first packet to be transmitted over a second network, and a module 904 for time-expanding the identified one packet to generate an expanded packet before passing the expanded packet to the first transmitter.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method used by a mobile communications device capable of communicating over multiple access networks, comprising:
   transmitting normal packets created from a stream of speech samples over a first network;
   identifying a first speech sample of one normal packet that will correspond in time to a first packet to be transmitted to a second network;
   choosing a certain number of consecutive speech samples beginning with the first speech sample;
   expanding, at a transmitter, the chosen number of speech samples in the normal packet to produce a first expanded packet;
   generating from these samples the first expanded packet for transmitting over the first network; and
   transmitting expanded packets on the first network for a time period that is based on a differential communications path delay of the first network and the second network.

2. The method of claim 1, further comprising:
   for the time period, expanding consecutive speech samples subsequent to a last sample used for generating the first expanded packet; and
   generating from these samples a number of expanded packets for transmitting over the first network.

3. The method of claim 1, wherein the first network comprises a packet-switched network.

4. The method of claim 3, wherein the packet-switched network includes a wireless LAN.

5. The method of claim 1, wherein the second network comprises a cellular network.

6. The method of claim 5, wherein the cellular network includes a packet-switched network.

7. A mobile communications device capable of communicating over multiple access networks, comprising:
   a first transmitter configured to transmit normal packets and expanded packets over a first network; and
   a processor configured to
      identify one of the normal packets to be transmitted over the first network that corresponds in time to a first packet to be transmitted over a second network,
      time-expand, at the transmitter, the identified normal packet to generate an expanded packet before passing the expanded packet to the first transmitter; and
      transmit expanded packets on the first network for a time period that is based on a differential communications path delay of the first network and the second network.

8. The mobile communications device of claim 7, further comprising:
   a second transmitter configured to transmit other packets over the second network.

9. The mobile communications device of claim 7, wherein the processor is further configured to time-expand each of the normal packets occurring in a time-period subsequent to the identified normal packet to generate respective expanded packets to be transmitted using the first transmitter.

10. The mobile communications device of claim 7, wherein the first network comprises a packet-switched network.

11. The mobile communications device of claim 10, wherein the packet-switched network includes a wireless LAN.

12. The mobile communications device of claim 7, wherein the second network comprises a cellular network.

13. The mobile communications device of claim 12, wherein the cellular network includes a packet-switched network.

14. A non-transitory computer readable media containing programming instructions for transmitting in a mobile communications device capable of communicating over multiple access networks, that upon execution thereof, causes one or more processors of the mobile device to perform the steps of:
   transmitting normal packets created from a stream of speech samples over a first network;
   identifying a first speech sample of one normal packet that will correspond in time to a first packet to be transmitted to a second network;
   choosing a certain number of consecutive speech samples beginning with the first speech sample;

expanding, at a transmitter, the chosen number of speech samples in the normal packet to produce a first expanded packet;

generating from these samples a first expanded packet for transmitting over the first network; and transmitting expanded packets on the first network for a time period that is based on a differential communications path delay of the first network and the second network.

15. A mobile communications device capable of communicating over multiple access networks, comprising:

a first transmitter configured to transmit normal packets and expanded packets over a first network;

means for identifying one of the normal packets to be transmitted over the first network that corresponds in time to a first packet to be transmitted over a second network;

means for time-expanding, at the first transmitter, the identified ene normal packet to generate an expanded packet before passing the expanded packet to the first transmitter; and means for transmitting expanded packets on the first network for a time period that is based on a differential communications path delay of the first network and the second network.

16. A mobile communications device capable of communicating over multiple access networks, comprising:

means for transmitting normal packets created from a stream of speech samples over a first network;

means for identifying a first speech sample of one normal packet that will correspond in time to a first packet to be transmitted to a second network;

means for choosing a certain number of consecutive speech samples beginning with the first speech sample;

means for expanding, at a transmitter, the chosen number of speech samples in the normal packet to produce a first expanded packet;

means for generating from these samples the first expanded packet for transmitting over the first network; and means for transmitting expanded packets on the first network for a time period that is based on a differential communications path delay of the first network and the second network.

17. The mobile communications device of claim 16, further comprising:

means for expanding, for the time period, consecutive speech samples subsequent to a last sample used for generating the first expanded packet; and means for generating from these samples a number of expanded packets for transmitting over the first network.

18. The mobile communications device of claim 16, wherein the first network comprises a packet-switched network.

19. The mobile communications device of claim 18, wherein the packet-switched network includes a wireless LAN.

20. The mobile communications device of claim 16, wherein the second network comprises a cellular network.

21. The mobile communications device of claim 20, wherein the cellular network includes a packet-switched network.

* * * * *